United States Patent [19]
Kammel et al.

[11] Patent Number: 5,664,650
[45] Date of Patent: Sep. 9, 1997

[54] UPPER MACPHERSON STRUT STEP BEARING FOR WHEEL SUSPENSIONS IN MOTOR VEHICLES

[75] Inventors: Helmut Kammel, Damme; Hubert Siemer, Dinklage; Ernst-Günther Jördens, Damme, all of Germany

[73] Assignee: Lemförder Metallwaren AG, Lemförde, Germany

[21] Appl. No.: 618,340

[22] Filed: Mar. 19, 1996

[30] Foreign Application Priority Data

Mar. 30, 1995 [DE] Germany .................. 195 11 642.9

[51] Int. Cl.⁶ ............................................. B60G 15/00
[52] U.S. Cl. ........................... 188/321.11; 267/141.4; 267/220; 280/668
[58] Field of Search .............. 188/321.11, 322.11; 280/668; 268/220, 141.1–141.7

[56] References Cited

U.S. PATENT DOCUMENTS

| | | | |
|---|---|---|---|
| 4,256,292 | 3/1981 | Sullivan, Jr. et al. | 188/321.11 |
| 4,478,396 | 10/1984 | Kawaura | 188/321.11 |
| 4,721,325 | 1/1988 | Mackovjak et al. | 188/321.11 |
| 5,342,029 | 8/1994 | Carter | 188/321.11 |

FOREIGN PATENT DOCUMENTS 0 136 023 A2   4/1985   European Pat. Off. .

*Primary Examiner*—Matthew C. Graham
*Attorney, Agent, or Firm*—McGlew And Tuttle

[57] ABSTRACT

An upper MacPherson strut bearing for wheel suspensions in motor vehicles, including a metallic housing, whose vertical section is pot-shaped. A rubber buffer is arranged in the housing, and a support piece, which can be connected to a shock absorber and which extends with radially extending projections into the rubber buffer is rigidly connected to the rubber buffer. A radially extending housing edge forms an abutment for an annular spring buffer made of rubber, against which the top end of a coil spring of the MacPherson strut, which coil spring surrounds the shock absorber, is supported. The radially extending housing edge is connected to a cover plate of the housing, which can be fastened to a part of the motor vehicle and covers the rubber buffer on its top side. A collar edge radially guiding the shock absorber is located on the underside of the housing. To optimize the action and the manufacture of such a MacPherson strut, the metallic housing is made of sheet metal in one piece with the collar edge provided on its underside and is wedged with the cover plate.

13 Claims, 2 Drawing Sheets

UPPER MACPHERSON STRUT STEP BEARING FOR WHEEL SUSPENSIONS IN MOTOR VEHICLES

FIELD OF THE INVENTION

The present invention pertains to an upper MacPherson strut step bearing for wheel suspensions in motor vehicles and more particularly, the present invention relates to an upper MacPherson strut step bearing including a metallic housing in a vertical section which is pot-shaped, a rubber buffer arranged in the housing and a support piece which can be connected to a shock absorber and which extends with radially extending projections into the rubber buffer connected to it rigidly, wherein the radially extending housing edge forms an abutment for the annular spring buffer, by which the top end of the coil spring surrounding the shock absorber is supported and is connected to the cover plate of the housing, the cover plate being fastened to a part of the motor vehicle and covering the rubber buffer on its top side.

BACKGROUND OF THE INVENTION

Such a MacPherson strut step bearing has been known from EP-0 136 023-A2. The outer edge of the housing, whose vertical section is pot-shaped, and the cover plate extend only radially in this prior-art design. They are usually welded together, and they do not form a radially acting guide for the top end of the coil spring of the MacPherson strut, which end is supported against the underside of the housing edge, or a support jacket for the spring buffer made of rubber or a comparable elastomeric material, so that this material can be squeezed out under a higher load and therefore it must have a corresponding material rigidity, which stands directly opposed to the desired comfort. The collar edge on the underside of the housing, which radially guides the shock absorber at the housing, is a separate component, which is connected to the bottom of the housing by spot welding.

SUMMARY AND OBJECTS OF THE INVENTION

The primary object of the present invention is to improve the effect of such an upper MacPherson strut step bearing, to increase its stability, and to make it possible to manufacture it from a reduced number of components at a more favorable cost.

According to the invention, an upper MacPherson's strut step beating for wheel suspensions in a motor vehicle is provided including a metallic housing with a pot-shaped vertical section, a rubber buffer arranged in the housing and a support piece which can be connected to a shock absorber and which support piece extends with radially extending projections into the rubber buffer connected to it rigidly. A radially extending housing edge forms an abutment for an annular spring buffer by which the top end of the coil spring surrounding the shock absorber is supported. The radially extending housing edge is connected to the cover plate of the housing. The cover plate of the housing can be fastened to a part of the motor vehicle and the cover plate of the housing covers the rubber buffer on its top side. A collar edge for radially guiding the shock absorber, is located on the underside of the housing. The metallic housing is made from sheet metal formed in one piece with the collar edge, the collar edge being provided on the underside of the metallic housing. The metallic housing is wedged with or is wedged within the cover plate.

Considerable manufacturing costs are saved due to the one-piece design of the housing with the part made in one piece with it on its underside for receiving the top end of the shock absorber and for radially guiding same. However, greater stability of the housing is also achieved at the same time, so that smaller wall thicknesses can be selected at a higher possible load or, vice versa, higher loads can be absorbed. A separate manufacturing process for the collar edge commonly used previously and another operation for connecting this collar edge to the housing are eliminated.

In another embodiment according to the present invention, the housing is connected to a cover plate, which has a jacket ring which extends downwardly beyond the spring buffer and into which the top end of the coil spring of the MacPherson strut supported by the buffer ring extends. This also leads to a substantial improvement in the stability of the upper MacPherson strut bearing and at the same to a radially acting guiding for the top end of the coil spring of the MacPherson strut. In addition, the buffer ring, made of rubber or the like, is surrounded on its outer jacket side, so that lateral squeezing of the material of the buffer ring cannot occur any longer. The material may therefore be selected as a material of lower rigidity, or correspondingly higher loads can be transmitted. It also becomes possible to fasten the top end of the bellows, which normally protectingly surrounds the shock absorber, within the jacket ring provided on the cover plate, either as a component that is independent from the buffer ring or as a component made in one piece with the buffer ring.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
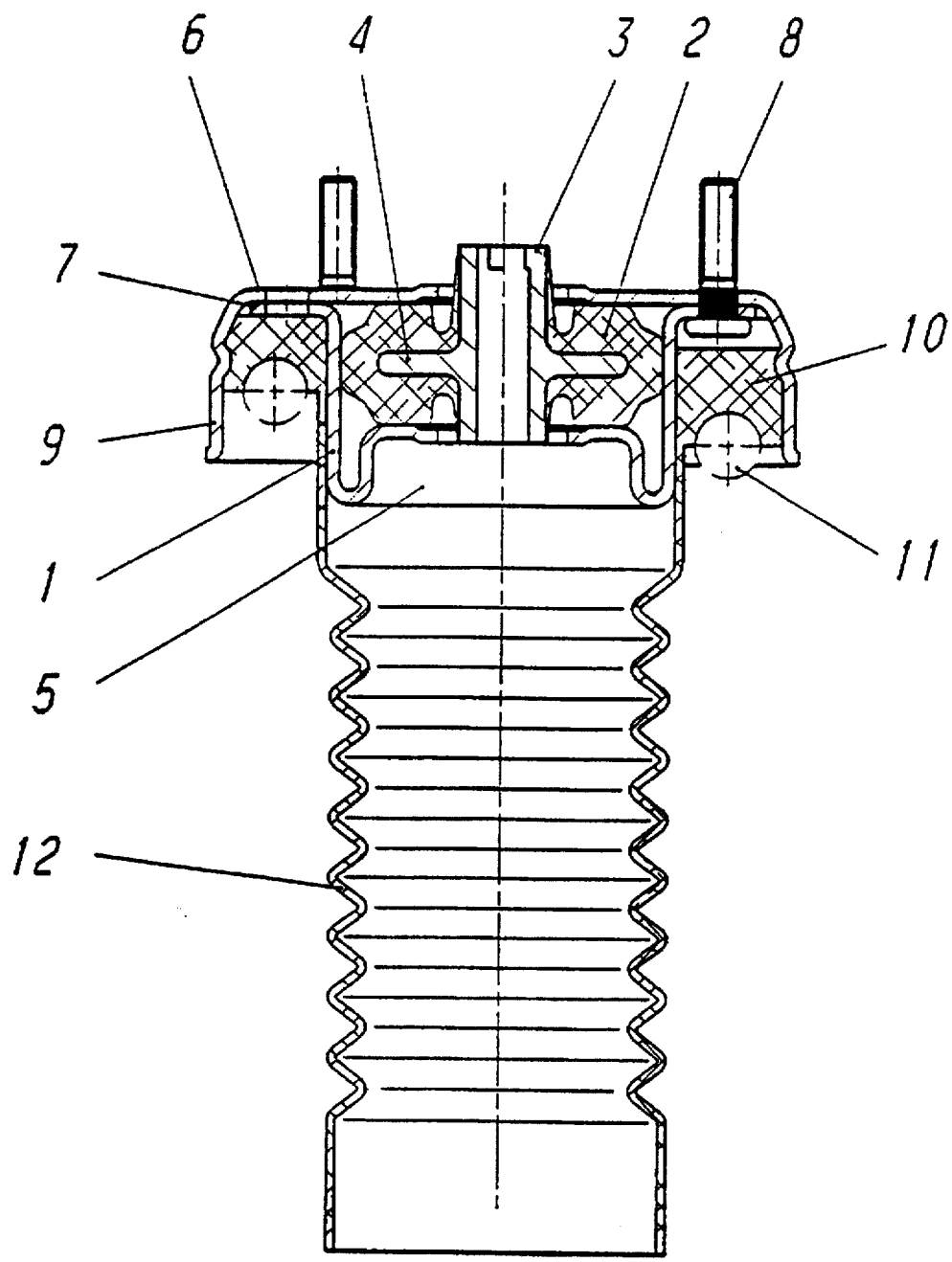
FIGS. 1 and 2 of the drawing show vertical sections of two exemplary embodiments of a design according to the present invention.

In the exemplary embodiments, the upper MacPherson strut bearing comprises a metallic housing 1, whose vertical section in a plane passing through the central axis of the MacPherson strut is pot-shaped. A rubber buffer 2 is arranged in the said housing. A support piece 3 is provided, which can be connected to the shock absorber, not shown in the drawing, and which has radially directed (extending) projections 4, which extend into the material of the rubber buffer 2. A collar edge 5 is made from sheet metal in one piece with the wall of the housing 1 on the underside of the housing 1. The top end of the shock absorber, not shown, extends into this collar edge 5 up to housing bottom wall, so that it is radially guided (limited as to radial movement) and held as a result. The support piece 3 is connected to the shock absorber through the hole in the support piece 3. The housing 1 is closed on the top side by a cover plate 6, which surrounds the support piece 3 with a clearance, so that the support piece 3 is cardanically movable in relation to the housing, utilizing a corresponding clearance in the bottom of the housing 1. The radially extending projections 4 have openings in some areas. A cardanically reduced characteristic can be achieved in the plane of the load as a result. The rubber buffer 2 is clamped in the housing 1 with the cover plate 6 in the conventional manner. The radially outwardly directed edge 7 of the pot-shaped housing 1 and the cover plate 6 are wedged (pressed) together. This makes possible a final handling of both the housing 1 and the cover plate 6 before mounting. Both components can thus be subjected to surface treatment, especially lacquering, already prior to the connection. This is not possible in the case of a prior-art welding. Fastening elements for the connection to the part of the motor vehicle are located on the cover plate. Fastening screws 8, which pass through holes of both the radially directed housing flange 7 and the cover plate 6, are shown. The cover plate 6 passes over at the outer edge into a jacket ring 9, which is directed downward and extends beyond a spring buffer 10, by which the top end of the coil spring 11 of the MacPherson strut is supported.

In the exemplary embodiment according to FIG. 1, a bellows 12, protectingly surrounding the shock absorber, is made in one piece with the spring buffer 10. The fastening of the top end of the bellows 12 is brought about by the fastening of buffer ring 10.

Figure 2:
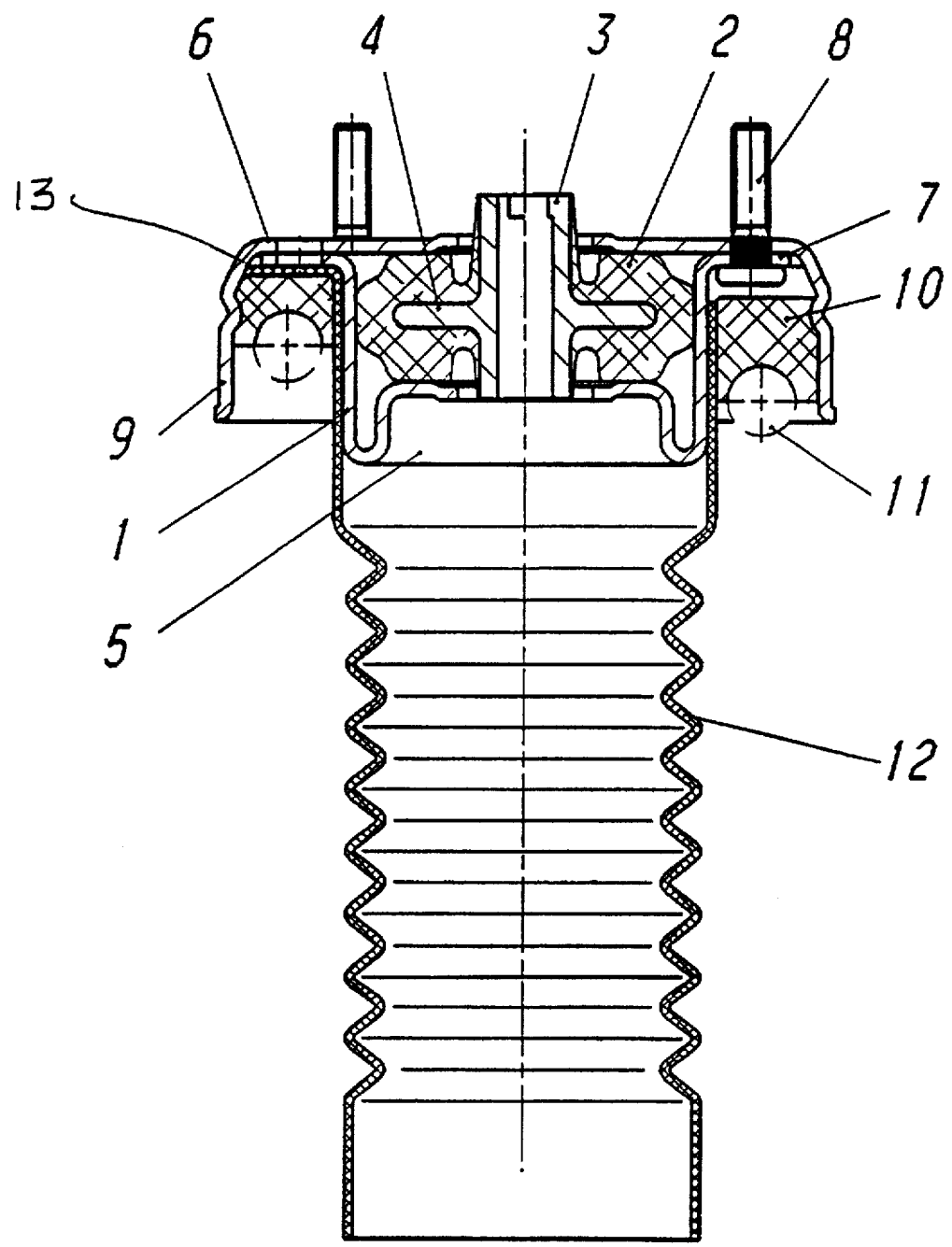

In the exemplary embodiment according to FIG. 2, the top end of the sealing bellows 12 has an outwardly directed flange. The outwardly directed flange 13 is clamped between the buffer ring 10 and the flange 7 of the housing. Both representations show clearly that the buffer ring 10 and optionally also the radial flange 13 of the bellows 12 may have openings for fastening the upper MacPherson strut bearing to a part of the motor vehicle.

While specific embodiments of the invention have been shown and described in detail to illustrate the application of the principles of the invention, it will be understood that the invention may be embodied otherwise without departing from such principles.

What is claimed is:

1. An upper MacPherson strut step bearing for wheel suspensions in a motor vehicle, comprising:
    a metallic housing, said housing being pot-shaped;
    a rubber buffer arranged in said housing;
    a support piece defining a part to be connected to a shock absorber, said support piece including radially extending projections extending into said rubber buffer and connected rigidly to said rubber buffer;
    an annular spring buffer for supporting a top end of a coil spring surrounding said shock absorber, said housing including a radially extending housing edge forming an abutment for said annular spring buffer;
    a housing cover plate which is to be fastened to a part of the motor vehicle, said housing cover plate covering said rubber buffer on a top side of said rubber buffer;
    a collar edge with axially extending collar edge walls defining a receiving space for radially guiding the shock absorber, said collar edge being located on an under side of said metallic housing, said metallic housing being formed of sheet metal in one piece with said collar edge, said collar edge being provided as an underside of said metallic housing, said metallic housing being wedged into said cover plate for fictionally positionally fixing said housing relative to said cover plate.

2. An upper MacPherson strut bearing according to claim 1, wherein said cover plate includes a downwardly directed jacket ring, said downwardly directed jacket ring extending in a downward direction beyond said spring buffer, a top end of a coil spring of the MacPherson strut being supported by said buffer ring and said top end extending into a region within said downwardly directed jacket ring.

3. An upper MacPherson strut bearing according to claim 1, wherein said radially extending projection includes at least one opening.

4. An upper MacPherson strut bearing according to claim 1, further comprising a sealing bellows formed in one piece with said spring buffer ring.

5. An upper MacPherson strut bearing according to claim 1, further comprising a sealing bellows including an outwardly directed flange, said sealing bellows being fastened between said spring buffer ring and said housing.

6. A MacPherson strut bearing according to claim 5, wherein said outwardly directed flange is clamped between said spring buffer ring and said radially directed housing flange.

7. An upper MacPherson strut step bearing for wheel suspensions in a motor vehicle, comprising:
    a metallic housing with an axially extending annular housing wall and with a radially extending annular housing flange providing a radially extending housing edge, a collar edge with an axially extending collar edge wall, said collar edge wall being spaced radially inwardly of said housing wall, and a radially extending housing bottom wall extending radially inwardly from said collar edge wall to a central shock absorber support piece opening, said collar edge wall cooperating with said housing bottom wall to define a receiving space wherein said collar edge wall provides a radial limit for the shock absorber, said metallic housing being formed of sheet metal in one piece with said collar edge, said collar edge being provided at an underside of said metallic housing;
    a rubber buffer arranged in said housing;
    a support piece defining a part to be connected to a shock absorber, said support piece including radially extending projections extending into said rubber buffer and connected rigidly to said rubber buffer;
    an annular spring buffer for supporting a top end of a coil spring surrounding said shock absorber, said housing radially extending housing edge forming an abutment for said annular spring buffer;
    a housing cover which is to be fastened to a part of the motor vehicle, said housing cover including a radially extending annular part covering said rubber buffer on a top side of said rubber buffer and including an axially extending annular jacket flange, said metallic housing being pressed into said cover plate with said housing edge fictionally engaging said cover plate at a location adjacent to a transition between said housing cover radially extending annular part and said cover axially extending annular jacket flange to fictionally positionally fix said housing relative to said cover plate.

8. An upper MacPherson strut bearing according to claim 7, wherein said jacket ring extends in an axial direction beyond said spring buffer, a top end of a coil spring of the MacPherson strut being supported by said buffer ring and extending into a region within said downwardly directed jacket ring.

9. An upper MacPherson strut bearing according to claim 7, wherein at least one of said radially extending projections includes an opening.

10. An upper MacPherson strut bearing according to claim 7, further comprising a sealing bellows formed in one piece with said spring buffer ring.

11. An upper MacPherson strut bearing according to claim 7, further comprising a sealing bellows including an outwardly directed flange, said sealing bellows being fastened between said spring buffer ring and said housing.

12. A MacPherson strut bearing according to claim 11, wherein said outwardly directed flange is clamped between said spring buffer ring and said radially directed housing flange.

13. An upper MacPherson strut step bearing for wheel suspensions in a motor vehicle, comprising:

a metallic housing with an axially extending annular housing wall and with a radially extending annular housing flange providing a radially extending housing edge, a collar edge with an axially extending collar edge wall, said collar edge wall being spaced radially inwardly of said housing wall, and a radially extending housing bottom wall extending radially inwardly from said collar edge wall to a central shock absorber support piece opening, said collar edge wall cooperating with said housing bottom wall to define a receiving space wherein said collar edge wall provides a radial limit for the shock absorber, said metallic housing being formed of sheet metal in one piece with said collar edge, said collar edge being provided at an underside of said metallic housing;

a rubber buffer arranged in said housing;

a support piece disposed at least partially within said rubber buffer with an outer surface contacting said rubber buffer, said support piece defining a part to be connected to a shock absorber, said support piece including radially extending projections extending into said rubber buffer and connected rigidly to said rubber buffer;

an annular spring buffer for supporting a top end of a coil spring surrounding said shock absorber, said housing radially extending housing edge forming an abutment for said annular spring buffer;

a housing cover which is to be fastened to a part of the motor vehicle, said housing cover including a radially extending annular part covering said rubber buffer on a top side of said rubber buffer and including an axially extending annular jacket flange, said metallic housing being pressed into said cover plate with said housing edge fictionally engaging said cover plate at a location adjacent to a transition between said housing cover radially extending annular part and said cover axially extending annular jacket flange to fictionally positionally fix said housing relative to said cover plate.

\* \* \* \* \*